April 22, 1930. H. STEPHANI 1,755,712
PROCESS OF RECOVERING VOLATILIZABLE METALS FROM ORES OR THE LIKE
Filed April 11, 1927
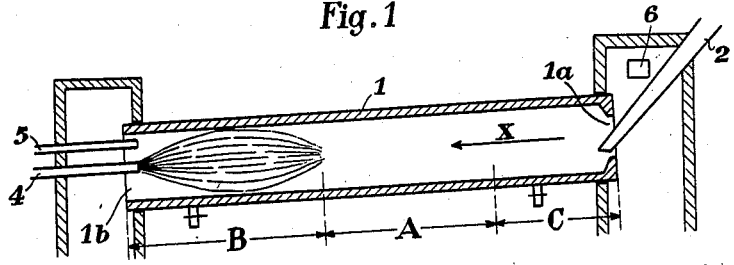
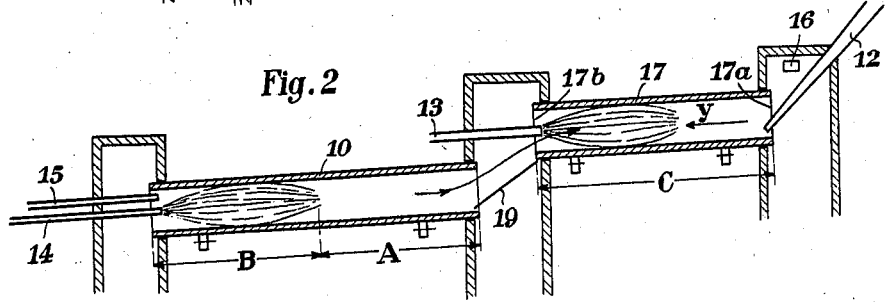
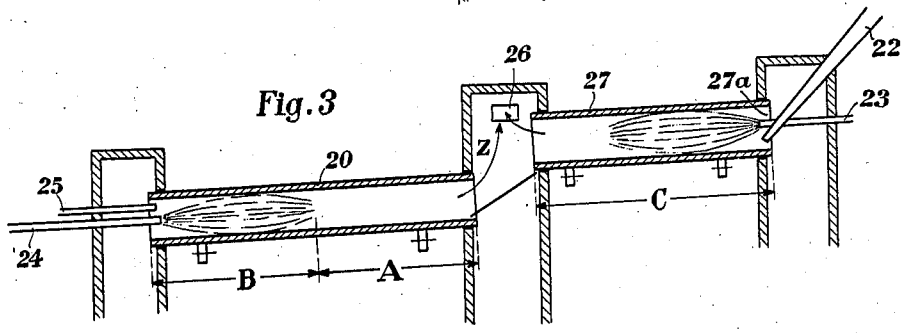
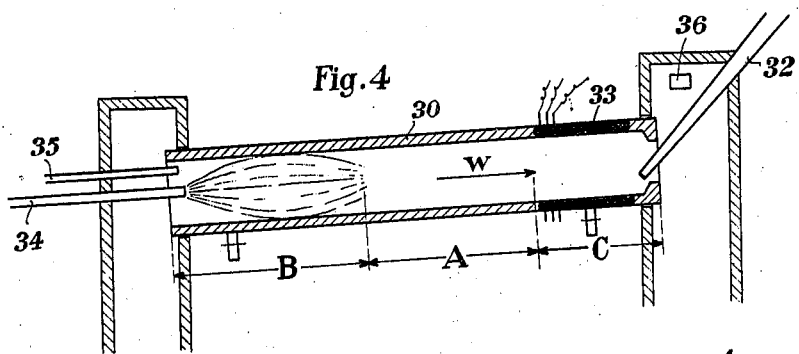
Inventor
Hermann Stephani
By King & Brog
Attys Patented Apr. 22, 1930

1,755,712

UNITED STATES PATENT OFFICE

HERMANN STEPHANI, OF MAGDEBURG, GERMANY, ASSIGNOR TO THE FIRM FRIED. KRUPP GRUSONWERK AKTIENGESELLSCHAFT, OF MAGDEBURG-BUCKAU, GERMANY

PROCESS OF RECOVERING VOLATILIZABLE METALS FROM ORES OR THE LIKE

Application filed April 11, 1927, Serial No. 182,838, and in Germany April 12, 1926.

My invention relates to the art of continuously extracting volatilizable metals from ores, metalliferous products and metallurgical residues of various kinds in the form of metal fumes.

The invention has particular reference to a process of recovering volatilizable metals disclosed e. g. in U. S. Patent 959,924 to Dedolph, May 31, 1910, in which it has been proposed to supply the material to be treated, mixed with reducing agents such as fuel, to an inclosed chamber, admitting flame and air to the chamber, the flame being admitted at a region remote from the region where the material is admitted to the chamber, continuously liberating the metal as oxide in the form of fume, carrying off and collecting the fume thus formed, and continuously removing the residue from the chamber.

With said process fusion of the material takes place, and although it is often desirable to obtain the residues from the metallurgical furnace, in a fused or sintered state, fusion entails the disadvantage that a considerable proportion of the metal is retained and absorbed by the slags.

It is an essential feature of said process of Dedolph that the reduction and volatilization of the metal is achieved by heating the charge to a high temperature, the period of the reaction being comparatively short, because the reaction takes place mainly in a zone, where the charge comes directly in contact with the flame.

Shortly after the reaction has started a very high temperature is obtained, by which the metal is rapidly volatilized; the volatilizing action however does not last long enough for effecting a thorough and complete volatilization of all the metal. It has already been suggested to overcome said drawbacks in U. S. Patent 1,269,110 to Ohlmer, June 11, 1918, viz, by subjecting the material, mixed with reducing substances, to the action of a reducing flame or reducing gases instead of that of an oxidizing flame. In the latter case however the treatment of the material consumes an excessively high amount of fuel which renders said process uneconomical in practice.

The primary object of my invention is to provide an improved treatment of the material, in which although a heating flame is used—as in the case of Dedolph—so as to obtain the residues in a melted or sintered state—a more complete volatilization of the metal than obtainable heretofore, is effected.

Other objects of the invention will appear hereinafter.

The nature and scope of the invention is briefly outlined in the appended claims and will be more fully understood from the following specification taken together with the accompanying drawing, indicating diagrammatically, how my method may be carried out in practice.

According to this invention it is proposed to liberate the metal from the material under treatment mainly in a region adjoining the intake end of the furnace, viz, in a zone, where the flame does not directly impinge upon the charge, thus withdrawing within the furnace the zone, where the reaction occurs, from the high temperature zone, where the material is subjected to the direct action of the flame and is liable to be melted.

My experiments have shown that various steps may be taken in order to liberate the metal at said comparatively early stage of the treatment:

Satisfactory results are obtained e. g. by intensely preheating the charge by suitable means, such as an auxiliary flame, before it enters the furnace or by preheating the charge by an additional source of heat, such as an electrical heating appliance, immediately after it is fed into the furnace; thus the charge is adapted to be more rapidly preheated within the furnace to a temperature at which the reduction sets in, the reduction then being mainly completed before the charge reaches the hottest zone of the furnace.

Another procedure for liberating the metal at an earlier stage of the treatment within the furnace than was obtainable heretofore, consists in intensifying the heating flame so as to increase its temperature and the volume of hot gases produced thereby but without substantially extending the zone in which the flame impinges upon the charge.

Another step to be taken for effecting the liberation of the metal at a comparatively early stage of the process consists in increasing the proportion of the reducing agents added to the material under treatment. As a matter of course the last mentioned step may be combined with any of those outlined above.

In addition thereto stiffening material may be mixed with the charge in an appropriate proportion consistent with the nature of the respective metal so as to retard the fusing or sintering of the charge, and to correspondingly extend the period, in which the metal is liberated from the charge in its solid state.

Various means may be applied for varying the effect of the heating flame on the charge: e. g. the volume of the pulverulent, liquid or gaseous fuel and the volume of air used for burning same may be varied in accordance with well-known practice so as to increase or to lower the temperature of the flame, its size and the volume of hot gases produced by the latter. As a matter of course the thickness of the layer of material passing through the furnace and the rotary speed of the latter and other pertinent factors may also be conveniently varied so as to obtain the best possible results in using my improved method of treatment.

The heating gases issuing from the flame may be conveniently conducted through the furnace in counter-current to the travel of the charge and the gaseous products of combustion may be discharged at the intake or at the exit of the furnace or at both places.

Attention is drawn to another advantage obtained in preheating the charge by an auxiliary flame which consists therein that the combustion of the metal to oxide is stimulated and rendered more complete, and that the said flame has also a purifying effect upon the oxides.

My improved method may be conveniently carried out in practice in tubular rotary furnaces which although being of comparatively short length, yet will afford a very thorough and complete extraction of the metal.

It is obvious to those skilled in the art that the above outlined steps appropriate for improving the extraction of the metal may be combined and varied in different ways without substantially departing from the scope of the following claims and without deviating from the spirit and the fundamental ideas of this invention.

The accompanying drawing shows diagrammatically some furnace plants suitable for the purposes of the present invention:

In the rotary furnace 1 shown in Fig. 1 the material mixed with the reducing agent is fed at the charging end of the furnace 1ª by a feeding device 2. The material will travel through the furnace in the direction of the arrow X towards a flame produced by a burner 4 at the exit end 1ᵇ of the furnace.

The air for combustion is supplied through the tube 5. The gaseous products of combustion pass through the furnace in a counter current relative to the travel of the material and are discharged through the outlet flue 6.

From the different zones and the extension of the flame indicated in Fig. 1 it will be understood that the reduction zone A is withdrawn towards the intake end of the furnace viz, as far away as possible from the direct impingement of the flame, and that the volatilization of the metal is substantially finished when the material reaches the hottest zone B of the furnace.

It is therefore imperative to make the preheating zone C relatively shorter than in the case of the Dedolph process and to considerably accelerate the preheating action in order to insure that the volatilization of the metal is subsequently complete before any fusion of the charge occurs.

The furnace plant shown in Fig. 1 relates to all those cases referred to above in which the reducing action is initiated at an earlier stage of the treatment by increasing the proportion of the reducing agent mixed with the material, and also relates to that modified form of this process in which the material is more rapidly preheated by increasing the heating effect of the main flame. If comparatively little air is supplied to the burner 4 a long soft flame will be produced while by supplying a comparatively large quantity of air and by blowing the fuel into the furnace under high pressure a comparatively short jet flame is produced which, although not extending so far into the furnace as in the case of the soft flame, will produce a higher average temperature throughout the furnace. The heating effect of the flame may be controlled by any suitable means known in the art as in the case of an ordinary Bunsen-burner.

Fig. 2 diagrammatically indicates a modified process in which the material is supplied in a preheated state into the tubular rotary furnace 10. Also in this case fuel is supplied through a burner 14 while the air is introduced through the tube 15. The material, fed by the feeding device 12 into the charging end 17ª of the preheating furnace 17, will travel therethrough in the direction of the arrow Y and will eventually drop over the chute 19 into the metallurgical furnace 10.

The preheating of the material supplied through feeding device 22 is accomplished by a burner 13 which, as seen in Fig. 2, is arranged at the exit end 17ᵇ of the furnace 17 in such a manner as to produce a flame which is opposed to travel of the material. As indicated in Fig. 2 the gases issuing from the main furnace 10 are discharged jointly with those produced by the auxiliary burner 13 through the outlet flue 16.

The furnace plant shown in Fig. 3 corresponds as to its function substantially with that shown in Fig. 2 except for the auxiliary source of heat for preheating the material, e. g. burner 23, which is arranged at the charging end 27ª of the furnace 27. In this preheating furnace the material, which is supplied through feeding appliance 22, and the heating gases travel in the same direction. The gases produced within the main furnace 20 by the gaseous fuel and air admitted through burner 24 and tube 25 respectively pass therethrough in counter current to the material in the direction of arrow $z$ and are discharged jointly with the gases issuing from the preheating furnace 27 through a flue 26 intermediate of both furnaces. The reduction commences shortly after the preheated material is fed into the main furnace 20; as the result of the preheating even in a tubular furnace which is comparatively short in length the reduction is substantially completed before the material reaches the hottest zone B where it comes into direct contact with the flame.

For another modified process diagrammatically illustrated in Fig. 4, I propose to use a furnace of the type shown in Fig. 1. In this case the material which is supplied through feeding device 32 is more rapidly preheated to the appropriate temperature within the main furnace 30 by applying an auxiliary source of heat in the preheating zone C, e. g. an electric heating device 33. Also in this case fuel is supplied through a burner 34 while the air is introduced through tube 35. As in the cases of Figs. 1 and 2 the gases produced within the furnace will travel in the direction of arrow $w$ viz., in counter-current to the path of the material and will be discharged through the flue 36.

The main feature of this invention consists in withdrawing the reducing zone as far as possible from the region of the hot main flame by providing appropriate means for causing the reduction of the material to be accomplished at a comparatively early point in the furnace.

It will be clear to those skilled in the art of designing metallurgical furnaces and appliances to be used in connection therewith that various structural modifications may be made in the design of furnaces for the purpose set forth without substantially departing from the spirit of this invention.

What I claim is:

1. A continuous process of recovering volatilizable metals from ores, metalliferous products, metallurgical residues and the like, comprising continuously charging the material mixed with reducing agent into a heated metallurgical furnace, continuously admitting flame and air into the furnace, the flame being admitted at a region remote from the region where the material is charged into the furnace, causing the material to move through the furnace counter-current to the flow of products of combustion from said flame and impinging said flame only adjacent the region of admission thereof upon said material whereby the latter is heated to fusion or sintering temperature characterized in that the material is heated sufficiently to vaporize the bulk of the volatilizable metal before it reaches the region where the flame impinges upon it and it is heated to fusion or sintering temperature.

2. Process as defined in claim 1, the material is preheated adjacent the region where it is charged into the furnace by a controllable heating means independent of said flame.

3. Process as defined in claim 1, in which the material is preheated before being charged into the furnace.

The foregoing specification signed at Berlin, Germany, this 17th day of March, 1927.

HERMANN STEPHANI.